United States Patent [19]

Carlsson et al.

[11] 4,175,073
[45] Nov. 20, 1979

[54] REACTIVE DERIVATIVES OF HS-GROUP-CONTAINING POLYMERS

[75] Inventors: Jan P. E. Carlsson, Uppsala; Rolf E. A. V. Axen, Balinge; Hakan N. Y. Drevin, Brunna; Goran E. S. Lindgren, Almunge, all of Sweden

[73] Assignee: Pharmacia Fine Chemicals AB, Uppsala, Sweden

[21] Appl. No.: 882,547

[22] Filed: Mar. 2, 1978

[30] Foreign Application Priority Data

Mar. 4, 1977 [SE] Sweden ............................. 7702463

[51] Int. Cl.$^2$ ................................................ C07G 7/00
[52] U.S. Cl. ........................... 260/112 R; 260/112.5 R; 526/303; 528/374; 528/375; 536/1; 536/18; 536/33; 536/47; 536/51; 536/106; 536/112; 525/347; 525/351; 525/375; 435/178; 435/180
[58] Field of Search .................... 260/112 R, 112.5 R; 536/1, 112, 106, 18, 33, 47, 51; 526/23, 30, 303; 528/374, 375

[56] References Cited

U.S. PATENT DOCUMENTS 3,666,739  5/1972  Burke et al. ........................ 536/33
3,947,352  3/1976  Cuatrecasas ....................... 536/47

OTHER PUBLICATIONS

Cleland, Biochemistry, 3, pp. 480–482, (1964).

Primary Examiner—Melvyn I. Marquis
Attorney, Agent, or Firm—Fred Philpitt

[57] ABSTRACT

A novel class of reactive derivatives of polymers containing HS-groups is disclosed in which derivatives a number of the HS-groups are converted to a disulphide group of the formula -S-S-A-Z, where A is a hydrocarbon residue having 1-10 carbon atoms and Z is a group

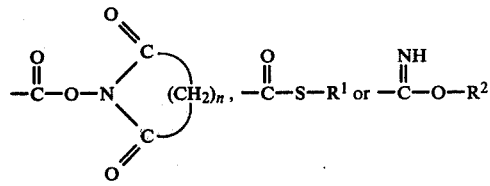

or acid addition salts of the last mentioned group, where n is 2 or 3, $R^1$ is 2-pyridyl, 5-nitro-2-pyridyl or 4-pyridyl and $R^2$ is methyl or ethyl. The novel derivatives may be used, for example, as thiolating agents or as carriers for e.g. enzymes or other proteins etc.

8 Claims, No Drawings

REACTIVE DERIVATIVES OF HS-GROUP-CONTAINING POLYMERS

The present invention relates to reactive derivatives of polymers containing HS-groups, it being possible to use said derivatives as, for example, thiolating agents or as carriers for, e.g. enzymes or other proteins etc.

The reactive derivatives according to the invention are characterized in that a number of the HS-groups are converted to a disulphide group of the formula $$-S-S-A-Z,$$

where A is a hydrocarbon residue having 1–10 carbon atoms, preferably 1–6 carbon atoms, and Z is a group

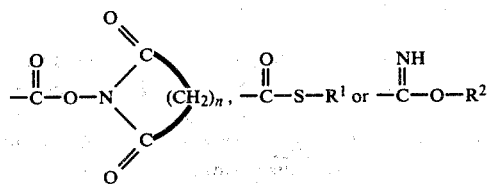

or acid addition salts of the last mentioned group, where n is 2 or 3, $R^1$ is 2-pyridyl, 5-nitro-2-pyridyl or 4-pyridyl and $R^2$ is methyl or ethyl.

The polymer may be insoluble or soluble in aqueous liquids. The polymer may be prepared synthetically or it may have a natural origin and be provided with groups of the formula —SH. It may also be of an organic or partly inorganic nature. A particularly important group of polymers is one comprising HS-group-containing derivatives of such biopolymers as polysaccharides, proteins and polypeptides. The polymer may be cross-linked to a water-insoluble network, which, however, may be swellable in water. An example of water-insoluble polymers are HS-group-containing derivatives of agarose, cross-linked dextran or cross-linked starch (e.g. cross-linked with epichlorohydrin to form an insoluble gel), cellulose or other water-insoluble polysaccharides or glass. As an example of water-soluble polymers can be mentioned HS-group-containing derivatives of dextran, starch or other water-soluble polysaccharides. Other examples of polymers in this context are native or modified soluble or insoluble proteins or polypeptides having free HS-groups. In many cases it is an advantage to use HS-group-containing derivatives of water-insoluble, but water-swellable polymer substances, e.g. such substances as those comprising cross-linked polymer substances containing hydrophilic groups, such as hydroxyl groups.

There are many examples of polymeric substances containing HS-groups. For example one such polymer is described in Acta Chem. Scand. Vol. 17 (1963), pgs. 2610–2621.

Some such polymers containing free HS-groups or disulphide groups which can readily be converted to free HS-groups are commercially available. An example of this are copolymers of acrylamide containing the group

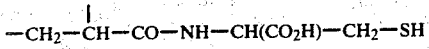

(Enzacryl ® Polythiol, Koch-Light Laboratories Ltd., England) and glass substituted with the group

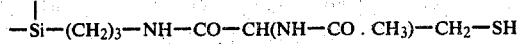

(Corning Thiol CPG, Corning Glass Co, USA).

Other examples include agarose substituted with the group —O—CH$_2$.CH(OH).CH$_2$—SH and agarose substituted with glutathione groups with free HS-groups, which are obtained by reducing corresponding 2-pyridyl-disulphide derivatives of agarose which are commercially available (Thiopropyl-Sepharose ®6B and Activated Thiol-Sepharose ®4B from Pharmacia Fine Chemicals. Uppsala, Sweden).

In the case of the polymeric substances in question, the HS-group may be bound to a carbon atom present in a polymeric chain in the polymeric basic skeleton. Preferably, however, there are selected polymers in which the HS-group is bound to a carbon atom present in a group which branches out from a polymeric chain in the polymeric basic skeleton, and is hence more accessible. The carbon atom to which the HS-group is bound may be present in an aliphatic or aromatic group in the polymer and is preferably, in turn, directly bound to at least one carbon atom.

Remaining bonds on the first mentioned carbon atom are preferably saturated with hydrogen atoms. Preferably there are selected HS-groups present in the group —CH$_2$—SH or in a group

where the carbon atom is seated in an aromatic ring, such as a benzene ring. Preferably the polymer thus contains at least one group of the formula

where one of the remaining bonds of the carbon extends to another carbon atom and remaining bonds to carbon and/or hydrogen. What has been said above regarding the bonding of the HS-group to a carbon atom in the polymer substance also applies to the group —S—S—A—Z in the novel polymeric derivatives according to the invention.

The reactive derivatives according to the invention can be prepared, for example, by thiolating a basic polymer which does not contain HS-groups in a known manner, for example by amination and subsequent reaction with a thiolating reagent, such as thiolimidate or N-acetylhomocystein thiolacton in the case of hydroxylcontaining polymers, and reaction with a bifunctional agent of the formula $$R^1-S-S-A-Z \qquad (I)$$

in which $R^1$, A and Z all have the above significances.

When amino groups or thiol groups are already present in the polymer, corresponding steps in the above reaction sequence can be omitted.

The reactive derivatives according to the invention may also be prepared by providing the basic polymer with $R^1$—S—S—A— groups, in which $R^1$ and A both have the above significance. The thus modified polymer is then reacted with a reactant of the formula HS—A—Z, where A and Z both have the above significance. HS—A—Z can be prepared from $R^1$—S—S—A—Z by reduction under conditions in which the Z-structure is not influenced.

Compounds of the formula I can be prepared in a number of different ways. (See also patent application Ser. No. 882,546 filed simultaneously with this application). The methods of preparation most preferred today are the following:

Compounds of the formula I, in which Z is the group

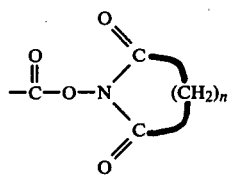

are produced by reacting a disulphide of the formula $$R^1\text{—S—S—A—COOH} \quad (II)$$

where $R^1$ and A both have the above significance, with N-hydroxysuccinimide when n=2 (or the analogue compound with n=3 when compounds with n=3 are desired) in the presence of a condensating agent.

The reaction is carried out in an organic solvent at a temperature of 10°–30° C. A suitable solvent is, for example, methylene chloride, ethyl acetate and dioxane. The reaction time varies with the choice of reaction components and reaction temperature.

The condensating agent used in this case may be one which is common in esterifying reactions, for example N,N'-dicyclohexylcarbodiimide.

The starting compound of the formula II can be prepared by reacting a mercaptoalkyl carboxylic acid of the formula $$HS\text{—A—COOH} \quad (III)$$

with a dipyridyl disulphide of the formula $$R^1\text{—S—S—}R^1 \quad (IV)$$

in which formulae A and $R^1$ both have the above significance.

This reaction is carried out in an organic solvent at a temperature of 10°–30° C. A suitable solvent is, for example, ethanol, ethyl acetate and dioxane. The reaction time varies with the choice of reaction components and reaction temperature.

Compounds of the formula I, in which Z is the group

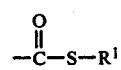

are prepared by reacting a disulphide of the formula II above with the corresponding thiopyridone in the presence of a condensating agent in an organic solvent at initially low temperature, for example −20° C., for approximately 1–2 hours, and thereafter at ambient temperature (e.g. 20° C.). A suitable solvent is, for example, methylene chloride, ethyl acetate and dioxane. The condensating agent used is preferably N,N'-dicyclohexylcarbodiimide.

Advantageously the starting material used comprises a mixture obtained by reacting a compound of the formula III with a compound of the formula IV.

Compounds of the formula I, in which Z is the group

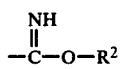

are prepared by reacting a thiolimidate of the formula

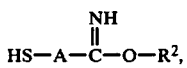

where $R^2$ and A both have the above significance, with a pyridyl disulphide of the formula $R^1$—S—S—$R^1$, where $R^1$ has the above significance, in an organic solvent. A suitable solvent in this respect is, for example, methanol containing approximately 10% glacial acetic acid.

With the derivatives according to the invention, organic low molecular compounds, peptides, proteins, carbohydrates etc., which contain amino-, HS- or HO-functions reactive to the group Z can be bound covalently to the polymer via one or more of said functions and then split off by breaking the bridge —S—S—, for example by reductive splitting or thiol-disulphide exchange. Thus, if the polymer conjugate is treated with a reductant, e.g. a low molecular thiol, the bound component is released in a modified form containing one or more thiol groups. In this respect it is primarily of special value that the derivatives according to the invention can be coupled together with substances containing amino groups, wherewith a relatively stable bond is obtained at the coupling site.

If the carrier polymer is an insoluble polymer, e.g. agarose or cross-linked dextran or glass, it constitutes a thiolating agent for components containing amino groups, e.g. proteins.

Thiolating with such a (solid phase)-thiolating agent has certain, obvious advantages in comparison with conventional techniques, which are normally carried out in homogeneous soluble systems. For example the product is more uniform with regard to the degree of thiolation. After the formation of the gel conjugate, all material which has not been immobilized (not modified) is washed away before the modified molecules are released by reduction. This means that the desorbed material contains at least one thiol group. Conventional protein thiolating methods (using, e.g. N-acetylhomocystein thiolacton or thiolimidates) often lead to heterogeneous product mixtures such that some molecules can obtain more thiol groups and others none, even though analysis shows that the mean thiol content is that intended. It is also difficult to separate thiolated material from unthiolated material when using conventional separation techniques. (In the case of certain applications, e.g. when preparing heavy atom derivatives of thiolated proteins, it is essential that the thiolated material is as homogeneous as possible). Thiolation by solid phase techniques in this manner should also provide certain steric specificity so that preferably certain exposed amino groups in the molecules intended for thiolation are modified.

Gel derivatives of the aforementioned type having imidate- and ester-structures can also form suitably activated carriers for immobilizing enzymes and other proteins or polypeptides.

Of special interest is the possibility of reductively splitting-off and washing away a bound enzyme when this has lost its activity and reusing the carrier material after having been subjected to regeneration. Application of enzyme-immobilizing techniques on an industrial scale have been retarded because of the high costs of the carrier material and because of the fact that the carriers must be discarded when the enzyme has been inactivated, since the majority of the immobilizing methods results in stable covalent bonds which are not readily split.

EXAMPLES OF PREPARATION

EXAMPLE 1

Synthesis of agarose derivatives containing disulphide-bound N-hydroxysuccinimide ester structures Sepharose® 4B thiosulphate (15 g sedimented gel) having a substitution degree of approximately 100 μmole thiosulphate groups per g of dried gel, was prepared from Sepharose® 4B (beads of agarose from Pharmacia Fine Chemicals AB, Uppsala, Sweden) in accordance with Axén, et al. (Acta Chem. Scand. B29 (1975), pgs. 471-474) was washed with 0.1 M NaHCO$_3$ and reduced with 150 mg dithiothreitol (in 15 ml) for 45 minutes at +23° C. The gel was washed with distilled water, 0.1 M Na-acetate buffer —0.3 M NaCl pH 4.8 and 0.1 M Na-acetate buffer pH 4.8:EtOH=70:30.

The substance was sucked off on a glass filter and then brought to a dry state, by sucking air therethrough, whereafter the gel, which now contained HS-groups, was mixed with 7 ml 0.1 M Na-acetate buffer —0.3 M NaCl pH 4.8 and 45 mg N-succinimidyl-3(2-pyridyl dithio)propionate in 3 ml 99.5% ethanol. The reaction was permitted to continue under mild agitation at +23° C. for 30 minutes, whereafter the gel was sucked off on a glass filter and washed with Na-acetate buffer pH 4.8:ethanol=70:30 and then with pure 99.5% ethanol. The agarose derivative obtained was stored in the form of a suspension in 99.5% ethanol at +4° C.

The substitution degree of the agarose derivative with respect to N-hydroxysuccinimide ester groups, was determined by exposing the gel to a slightly alkaline pH (8-10) for 60 minutes, whereupon N-hydroxysuccinimide was released and determined spectrophotometrically at λ=260 nm ($\epsilon = 8.2 \times 10^3 M^{-1} cm^{-1}$). The agarose derivative obtained contained approximately 40 μmole N-hydroxysuccinimide ester groups/g dried derivative.

N-succinimidyl-3(2-pyridyldithio)propionate can be prepared in the following manner:

1.9 g (8.6 mmole) of 2.2$^1$-dipyridyl disulphide is dissolved in 10 ml ethyl acetate. A solution of 0.9 g (8.6 mmole) 3-mercaptopropionic acid in 10 ml ethyl acetate is added dropwise for 15 minutes whilst stirring, at the same time as 0.5 mg (2 drops) borontrifluoride etherate is added to the reaction mixture. After 20 h at room temperature under agitation the reaction mixture is vaporized (Büchi Rotavapor, <40° C.) and the solid yellow residue is slurried in 10 ml (cold) (+4° C.) ethyl acetate and filtered. 0.68 g (5 mmole) of N-hydroxysuccinimide is added to the filtrate, whereafter 1.03 g (5 mmole) of dicyclohexylcarbodiimide dissolved in 10 ml dry ethyl acetate are added dropwise for 15 minutes whilst stirring at room temperature. The reaction is permitted to continue under agitation for 5 hours at room temperature, whereafter the reaction mixture is cooled to +4° C. and the precipitated dicyclohexylcarbamide filtered off. The slightly yellow solution is vaporized and the oil dissolved in ethanol and permitted to crystallize at —20° C. The yield is 45%. Melting point 78.5°-80.5° C.

EXAMPLE 2

Synthesis of three agarose derivatives containing disulphide-bound activated carboxylic acids

I.

7 ml 0.1 M sodium acetate buffer, 0.3 M sodium chloride pH 4.8 and a solution of 80 mg N-hydroxysuccinimidyl(2-mercapto)propionate dissolved in 5 ml 99.5% ethanol were added to 3 g of washed and dry-sucked Thiopropyl-Sepharose® 6B (from Pharmacia Fine Chemicals AB, Uppsala, Sweden). Reaction was carried out for one hour at room temperature while stirring. Then the gel was first washed with a sodium acetate buffer pH 4.8, then with ethanol-water 70:30 and finally with ethanol 99.5%. The gel was stored as a suspension in ethanol at +4° C.

II.

7 ml 0.1 M sodium acetate buffer, 0.3 M sodium chloride pH 4.8 and 100 mg 3-mercaptopropionic acid dissolved in 5 ml 99.5% ethanol were added to 3 g of washed and dry-sucked Thiopropyl-Sepharose® 6B. Reaction was carried out for one hour at room temperature while stirring. Then the gel was washed with 2×25 ml 0.1 M HCl and 2×25 ml acetone+5% 0.001 M HCl. The gel was transferred to a flask provided with a magnetic stirrer and 15.3 ml acetone+5% 0.001 M HCl were added. Then 250 mg of thiopyridone and 480 mg of dicyclohexylcarbodiimide were added and the mixture was allowed to react for three hours at 31° C. After the reaction washing was carried out with 2×25 ml of acetone+5% water and 15×25 ml of ethanol (99.5%). The gel was stored as a suspension in ethanol at +4° C.

III.

7.0 ml 0.1 M sodium acetate buffer, 0.3 M sodium chloride pH 4.8 and 140 ml of methyl-4-mercaptobutyrimidate hydrochloride dissolved in 5 ml 99.5% ethanol were added to 3 g of washed and dry-sucked Thiopropyl-Sephadex® 6B. The mixture was allowed to react for 1.5 hours at room temperature and was then washed with sodium acetate buffer pH 4.8 and 10×25 ml of ethanol (99.5%) and was stored as a suspension in ethanol at +4° C.

The three agarose derivatives, I, II and III prepared above were tested in the following manner:

An amount of gel corresponding to 0.5 g of freeze-dried substance was washed with 12×15 ml of ice-cooled 0.001 M hydrochloric acid and sucked off and excess glycylleucine dissolved in 25 ml 0.1 N sodium hydrogen carbonate-sodium chloride solution was added thereto in a plastics centrifugation tube. The tube was slowly rotated for 1.5 hours at room temperature.

The gel was washed on a glass filter with 3×15 ml tris(hydroxymethyl)aminomethane buffer pH 8 and 3×15 ml acetate buffer pH 4 and 10-15 times with 15 ml of water and then 5–7 times with 15 ml of acetone. The gel was dried for 24 hours at 80° C.

Amino acid analysis gave the following results:

| Derivative | | μmol × g⁻¹ dry substance |
|---|---|---|
| I | 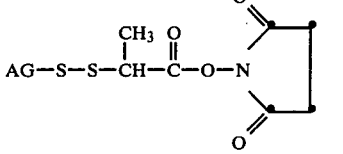 | 35–45 |
| II |  | 10–20 |
| III | 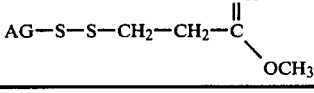 | 0–5 |

AG denotes the agarose-matrix.

EXAMPLE 3

Synthesis of a glass derivative containing disulphide-bound N-hydroxysuccinimide ester structures 0.1 g of glass containing thiol groups (Corning Thiol CPG 550, 0.03 mequiv. thiol groups/g, Corning Biological Prod. Dept. Medfield, Mass., USA) in 1.5 ml 0.1 M Na-phosphate-0.3 M HCl pH 7.5 was mixed with 0.5 ml 50 mM dithiothreitol. Reduction was allowed to proceed for 60 minutes at +25° C. The glass derivative was washed with 0.3 M NaCl (3×10 ml) and incubated in 1.0 ml 0.1 M Na-acetate buffer pH 4.6. 0.25 ml 50 mM N-succinimidyl-3(2-pyridyl dithio)propionate in abs. ethanol was then added. After reaction for 60 minutes at +25° C. while stirring by rotation, the glass derivative was washed with 0.1 M Na-acetate buffer pH 4.6, distilled H₂O and 99.5% EtOH. The glass derivative obtained (91 mg) was finally dried in vacuum at +25° C.

The substitution degree of the glass derivative with respect to N-hydroxysuccinimide ester groups was determined by exposing the derivative to weakly alkaline pH (10 mg of glass derivative +2.5 ml of NaHCO₃—solution pH 9) for 60 minutes at +25° C., N-hydroxysuccinimide being liberated and determined spectrophotometrically at 260 nm ($\epsilon = 8.2 \times 10^3 M^{-1} cm^{-1}$). The glass derivative contained about 6 μmole N-hydroxysuccinimide ester structures/g dry glass.

EXAMPLE 4

Synthesis of a dextran derivative containing disulphide-bound N-hydroxysuccinimide ester structures 5 g of dextran T-70 (Pharmacia Fine Chemicals AB, Uppsala, Sweden) were dissolved in 20 ml 20% NaOH containing 1% NaBH₄. 5 g of 2-chloroethylamine hydrochloride were added and the mixture was stirred for 18 hours at +90° C. After cooling to +25° C. and neutralizing with 6 M HCl the small amount of precipitation formed was removed by centrifugation. The supernatant was dialyzed against distilled water and freeze-dried.

5 g of dry prouct (aminoethyldextran) were obtained. The nitrogen content was found to be 1.5%.

1 g of the aminoethyldextran was dissolved in 30 ml 0.05 M Na-borate buffer pH 9 and N-succinimidyl-3(2-pyridyldithio)propionate (300 mg in 30 ml abs. ethanol) was added dropwise over 10 minutes while stirring. The reaction mixture was allowed to stand for additional 20 minutes whereafter 3 ml of concentrated acetic acid were added. The mixture thus obtained was dialyzed against 50% ethanol (3×2000 ml) for 48 hours and then evaporated to 15 ml and freeze-dried.

1 g of dry product (2-pyridyldisulphide dextran) was obtained.

0.12 ml of N-succinimidyl-3(2-pyridyldithio)propionate (50 mM in abs. ethanol) was dissolved in 1 ml 0.1 Na-acetate buffer—0.3 M NaCl pH 4.6. 40 μl 50 mM dithiothreitol were added and the mixture was stirred for 30 minutes. Then 20 mg of 2-pyridyl disulphide dextran (vide above) dissolved in 1 ml 0.1 M Na-acetate buffer—0.3 M NaCl pH 4.6 were added. After reaction for 60 minutes at +25° C., low molecular weight components were removed by gel filtration on Sephadex G-25 (beads of dextran cross-linked with epichlorohydrin from Pharmacia Fine Chemicals AB, Uppsala, Sweden) (the medium used was 0.3 M NaCl). The void material (3.0 ml) was found to contain about 6 mg of dextran derivative/ml.

The degree of substitution of the dextran derivative with respect to N-hydroxysuccinimide ester groups was determined by exposing the derivative to weakly alkaline pH (0.1 ml sample+1.9 ml H₂O+0.5 ml NaHCO₃ pH 9) for 60 minutes at +25° C., N-hydroxysuccinimide being liberated and determined spectrophotometrically at 260 nm ($\epsilon = 8.2 \times 10^3 M^{-1} cm^{-1}$). The dextran derivative contained about 25 μmole N-hydroxysuccinimide ester structures/g dry derivative.

In the Examples above derivatives in which A represents a straight or branched aliphatic residue were prepared. However, an aromatic residue may also form a part of the group A. Generally, however, an alkylene chain $-(CH_2)_m-$, wherein m is an integer 1–6, is chosen which optionally is substituted with one or more alkyl groups, the total number of carbon atoms of A being at most 10.

EXAMPLES OF APPLICATION

EXAMPLE A

Use of agarose derivative containing disulphide-bound N-hydroxysuccinimideester structures for enzyme immobilisation and protein thiolation 20 mg α-amylase ("bacterial type IIA", 4×cryst., from Sigma, USA) were dissolved in 3 ml of 0.1 M NaHCO₃—0.3 M NaCl. The α-amylase solution was admixed with 3 g agarose derivative, produced in accordance with Example 1 above and sucked dry (on a glass filter) and first washed with 99.5% ethanol and 1 mM HCl. The reaction was permitted to continue for 3 hours at +23° C. whilst agitating by means of rotation. The gel was then washed with 0.1 M NaHCO₃—0.3 M NaCl. Amino acid analysis showed that the gel derivative contained 120 mg α-amylase/g of dried derivative.

Determination of the α-amylase activity of the gel with 1% starch as substrate showed that the immobilised α-amylase had 30% of the activity of the native enzyme.

After washing the agarose-α-amylase conjugate carefully on a glass filter with 0.1 M NaHCO₃—0.3 M NaCl, the conjugate was incubated with 3 ml of 0.1 M NaHCO$_3$—0.3 M NaCl containing 50 mg dithiothreitol for 60 minutes. The insoluble material was then subjected to suction on glass filter and the filtrate was gel filtered on Sephadex ® G-25 (beads of dextran cross-linked with epichlorohydrin from Pharmacia Fine Chemicals AB, Uppsala, Sweden) (the medium used was the same buffer as above). Analysis of the void material showed that it contained 90% of the expected α-amylase quantity (from analysis of the gel-enzyme conjugate).

Determination of the thiol content of the modified α-amylase gave a substitution degree of 1.2 mole SH/mole of α-amylase.

EXAMPLE B

Use of glass derivative containing disulphide-bound N-hydroxysuccinimide ester structures for reversible immobilisation of an enzyme 1 mg of α-amylase (same type as in Example 1) was dissolved in 1.0 ml 0.1 M Na-phosphate—0.3 M NaCl pH 7.5. 10 mg of a glass derivative containing 0.06 μmole N-hydroxysuccinimide ester structures (prepared according to Example 3 above) were added to the solution. A blank assay was carried under identical conditions but with a glass derivative in which the N-hydroxysuccinimide ester structures had been hydrolysed (as described in the second paragraph of Example 3) before it was mixed with the solution of α-amylase.

The reaction was allowed to proceed for 24 hours at +23° C. whilst stirring by rotation. After sedimenting the glass derivatives, the supernatants were decanted off and the glass derivatives washed with 0.3 M NaCl. The amount of immobilized α-amylase was determined by measuring the α-amylase activity of the supernatants and of the glass derivatives (after reduction with 0.8 ml 0.1 M Na-phosphate—0.1 M NaCl pH 7.5+0.2 ml 50 mM dithiothreitol for 60 minutes at +25° C.). The determination of the activity was carried out by incubating 1.0 ml of a suitable dilution of supernatant from coupling respectively reduction with 1.0 ml of blue starch (1 tablet Phadebas ® Amylase Test from Pharmacia Diagnostics AB, Uppsala, Sweden, suspended in 4 ml of distilled H$_2$O) for 15 minutes at +25° C., whereafter 0.5 ml 0.5 M NaOH was added and A$_{610}$ of the supernatant determined after sedimenting surplus substrate and insoluble components.

The determinations of the activity showed that the reaction of the α-amylase derivative with the glass derivative containing N-hydroxysuccinimide ester groups gave a derivative containing 30 mg of α-amylase/g dry derivative whilst the non-specific adsorption which was determined with the corresponding glass derivative only amounted to ~1 mg/g glass.

What is claimed is:

1. A reactive derivative of an HS-group-containing polymer, wherein a number of HS-groups are converted to a disulphide group of the formula

—S—S—A—Z where A is a hydrocarbon residue having 1–10 carbon atoms and Z is a group

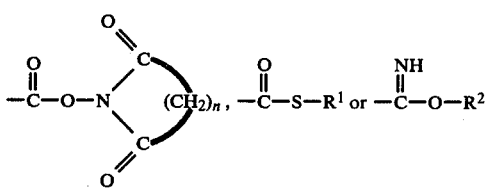

or acid addition salts of the last mentioned group, where n is 2 or 3, R$^1$ is 2-pyridyl, 5-nitro-2-pyridyl or 4-pyridyl and R$^2$ is methyl or ethyl.

2. A reactive derivative according to claim 1 wherein the polymer is a water-insoluble polymer.

3. A reactive derivative according to claim 1 wherein A is a hydrocarbon residue having 1–6 carbon atoms.

4. A reactive derivative according to claim 1 wherein Z is the group

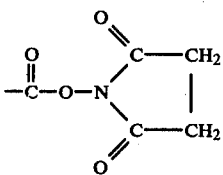

and A is —CH$_2$—CH$_2$—.

5. A reactive derivative according to claim 4 wherein the polymer is a polysaccharide derivative.

6. A reactive derivative according to claim 4 wherein the polymer is an agarose derivative.

7. A reactive derivative according to claim 4 wherein the polymer is cross-linked.

8. A reactive derivative according to claim 7 wherein the cross-linked polymer is insoluble in water but swellable in water.

* * * * *